Oct. 5, 1948.  N. M. COUTY  2,450,581
SWIVEL CONNECTION
Filed March 28, 1945

INVENTOR.
Norman M. Couty.
BY
Harness, Dickey & Pierce
ATTORNEYS.

Patented Oct. 5, 1948

2,450,581

UNITED STATES PATENT OFFICE 2,450,581

SWIVEL CONNECTION

Norman M. Couty, Detroit, Mich., assignor, by mesne assignments, to The Flex-O-Tube Company, Chicago, Ill., a corporation of Illinois Application March 28, 1945, Serial No. 585,215

3 Claims. (Cl. 285—97.5)

This invention relates to swivel connections or couplings for fluid ducts.

An object of the invention is to provide a swivel coupling for fluid duct in which the swiveled parts are efficiently sealed against leakage between them whether the pressure in the duct be positive or negative.

Another object of the invention is to provide in a single construction a swivel which automatically adjusts itself to maximum sealing position when the pressure transmitted therethrough is either positive or negative.

Still another object of the invention is to provide an economical swivel coupling useful either in pressure or suction ducts.

Other objects of the invention will become apparent by reference to the following detailed description taken in connection with the accompanying drawing.

Referring to the drawings.

Figure 1:
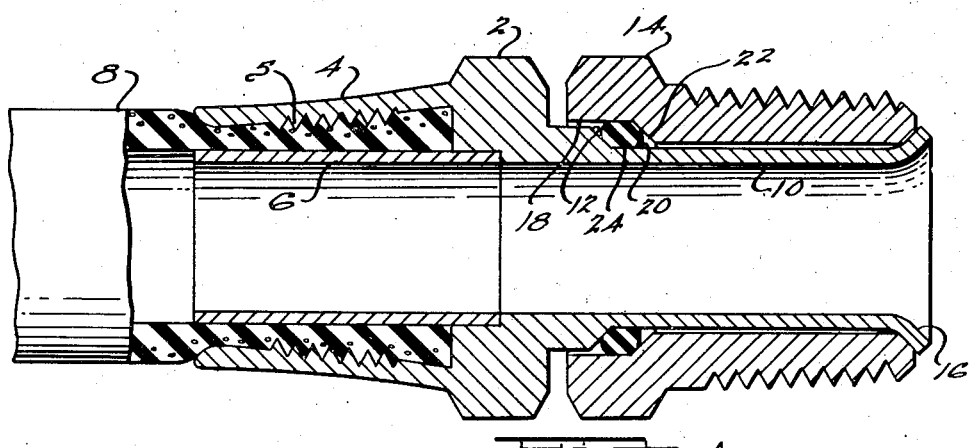
Fig. 1 is a longitudinal sectional view of a swivel connection embodying the invention herein shown attached to a portion of a flexible hose.
Figures 2, 3:
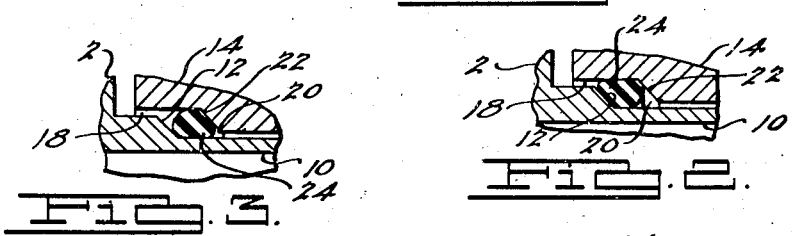
Fig. 2 is a fragmentary sectional view of the swivel connection of Fig. 1 showing the gasket in position to seal the coupling when subject to fluid under a positive pressure.
Fig. 3 is a view similar to Fig. 2 but with the gasket in the position assumed when there is a negative pressure in the coupling or suction or vacuum in the conduit including the swivel coupling.

Referring to the constructions shown in Figs. 1, 2, and 3 it will be noted that a coupling member is provided including a hollow main body portion 2 of hexagonal conformation having formed integrally and concentrically therewith an axially extending circularly sectioned skirt 4, the inner surface of which is formed to provide threads or grooves 5 to enhance its gripping effect on a flexible tube to be received thereby. A cylindrical sleeve 6 fixed at one end in a counterbore in the main body 2 projects concentrically therefrom in the same direction as the skirt 4. A flexible tube 8 has one end thereof received between the skirt 4 and the sleeve 6, and the skirt 4 is radially contracted to lock and seal such end between the skirt 4 and sleeve 6.

The main body portion 2 also has a tubular extension 10 formed integrally therewith and projecting therefrom in the opposite direction from the skirt 4 and sleeve 6, its bore forming a continuation of the bore in the tube 6. The tubular extension 10 is exteriorly provided with a tapered, generally frusto-conical seat 12 intermediate its length and which seat extends angularly to the axis of the tube.

A male threaded nut 14 telescopes a major portion of the tubular extension or tube 10 and is maintained against removal therefrom by the flared outer end 16 of the tube 10.

The axially inner end of the nut 14 is provided with a counterbore 18 providing a chamber 20 between the seat 12, and the axially inner face 22 of the counterbore 18 is approximately parallel to the seat 12; in other words, generally frusto-conical and preferably at an angle complementary to that of the seat 12. Thus an annular chamber 20 is formed between the nut 14 and the tube 10 which tapers in cross-sectional configuration towards its opposite ends axially of the coupling.

A gasket or sealing ring 24 is positioned in the chamber and may have any suitable cross-section but is preferable normally of circular section before being placed in the chamber. It is preferably of such cross-sectional size as to be at least slightly deformed when inserted between the parts of the fitting, that is, so that it is slightly compressed radially between the radially opposed walls of the chamber 20. While this sealing ring or gasket preferably has a sectional size or diameter when round, normally greater than the radial dimension of the chamber, even when compressed and deformed in the chamber it has a cross-sectional area less than the cross-sectional area of the chamber 20. The sealing ring or gasket 24 is formed of a pliable and readily resiliently yieldable material such as rubber, either natural or synthetic, or equivalent rubber-like material impervious to the passage of fluid and sufficiently pliable to yield under fluid pressures to which the coupling may be subjected in service. In some cases at least it may be preferable that the gasket material be also internally compressible, which may be accomplished, for instance, by introducing particles of compressible material, as for instance cork, into the above described composition.

By the above described construction it will be appreciated that if fluid under pressure is being transmitted through the connection and such fluid under pressure finds its way between the tubular extension 10 and the nut 14 between the axially outer ends thereof it will tend to flow through the chamber 20 and escape out past the axially inner end of the nut member 14. However, such fluid under pressure being transmitted to the chamber 20 will create a pressure differential upon opposite sides of the sealing ring 24 which will tend to force the ring 24 out through the axially inner end of the chamber 20. The sealing ring 24 being of the flexible and pliable nature above described may, under such circumstances, flow under the influence of such pressure, as illustrated in Fig. 2, and become wedged between the tapered walls at the axially inner end of the chamber 20, thus effectively sealing the nut member 14 to the tubular member 10 and preventing any leakage at this point. It will be appreciated that the greater the pressure applied to the sealing ring 24 the harder it will be wedged into the tapered rear end of the pocket 20 and will thus provide a seal which grows more effective with increases in pressure.

Likewise if the interior of the connection is subjected to a suction instead of a pressure, then it will be appreciated that there will be a tendency for air or other fluid surrounding the connection to flow in between the axially inner end of the nut member 14 and the tubular extension 10, through the chamber 20 and between the axially outer ends of the nut member 14 and tubular extension 10. Under such circumstances the difference in pressure on opposite sides of the sealing ring 24 will urge the sealing ring 24 toward the axially outer end of the chamber 20 and, similarly to the first described condition will, as illustrated in Fig. 3, tend to wedge the sealing ring 24 between the opposite tapered walls at the axially outer end of the chamber 20 and thus establish an effective seal between the nut member 14 and the tubular extension 10. As in the first described case the greater the difference in pressure on the opposite sides of the sealing ring 24 the more effective will be the seal between the nut member 14 and tubular extension 10 provided by the sealing ring 24.

It will be understood that during application and/or removal of the fitting with respect to a co-operating part and at which time there will be neither suction or pressure on the inner side of the same, the resistance of the sealing ring 24 to relative rotation between the nut member 14 and the coupling member will be so small as to not interfere with the desired swiveling between these parts and which swiveling is necessary or at least desirable in the securement of the connection or coupling to a co-operating part.

It will be appreciated that the gist of the present invention is in connection with the sealing ring 24 and the conformation of the chamber in which it is received and, accordingly, the particular conformation of the coupling member shown in Figs. 1, 2, and 3 is not essential to the carrying out of the present invention. Instead of using the type of coupling member shown in Figs. 1, 2, and 3 the end of a tube may be suitably formed to accomplish the same result and this is illustrated in Fig. 4.

Figure 4:
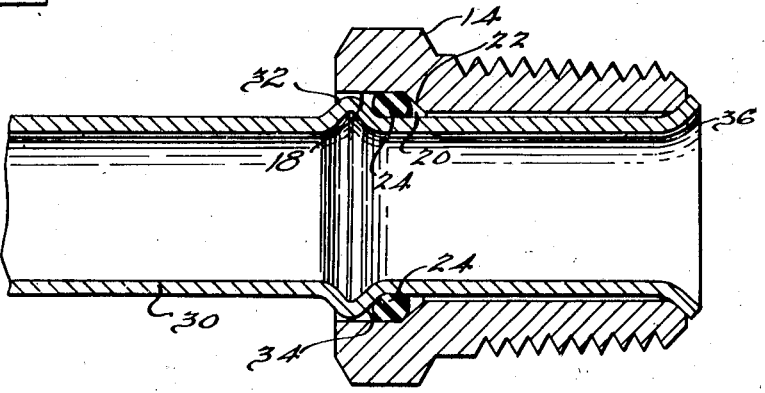
Fig. 4 is a longitudinal sectional view of a modified form of swivel fitting embodying the invention herein.

In Fig. 4 the nut member 14 is identical to that shown in the preceding figures but instead of the coupling member there shown a tube 30 is operated upon to form an annular bulge or rib 32 at a distance from one end thereof corresponding with the distance which the seat 12 is formed from the end of the tubular portion 10 in the first described construction, the bulge 32 being of an external diameter corresponding with the diameter of that portion of the first described coupling fitting within the counterbore 18 of the nut member 14 and being formed to provide a seat 34 on its axially outer face corresponding generally in angularity with the seat 12 of the first described construction. The axially outer end of the tube 30 is flared outwardly as at 36 in exactly the same manner as the flare 16 of the tube 10 in the first described construction. The sealing ring 24 may be identical with the sealing 24 of the first described construction and it will, of course, be appreciated that this modified construction functions in identically the same manner as the first described construction as far as the features of the present invention are concerned.

Having thus described my invention, what I claim by Letters Patent is:

1. A swivel coupling of the character described comprising a pair of swivelly related concentric tubular members the inner of said tubular members being formed from tubular stock and having the wall thereof spaced from its end deformed into an annular radially outwardly projecting rib, the outer of said tubular members being formed with a counterbore the inner end of which is formed with a wall surface converging toward the inner of the tubular members, the counterbore being of a depth to overlap the rib and afford a substantially enclosed chamber between the rib and said inner converging wall of the counterbore, said rib being formed at its inner side to converge with respect to the wall of the counterbore, and a sealing gasket of smaller cross-sectional area than the chamber within said counterbore and permitting relatively easing swivelling of the members, said gasket being of resilient pliability and deflectable by opposite axial pressure differentials to move into wedging relationship with the respective converging surfaces at the ends of the chamber.

2. In combination in a swivel coupling, a tubular member, an elongated externally threaded sleeve member freely swivelly disposed about said tubular member, said tubular member having axially disposed radially extending integral portions spaced apart less than the length of said sleeve member and having radial extent greater than the normal internal diameter of the sleeve member, one end of the sleeve member opposing one of said radially extending portions, the opposite end section of the sleeve member having an internal enlargement within which the remaining radially extending portion is freely encompassed and being of a depth to afford a substantial longitudinal clearance inwardly from the encompassed portion, and a resilient sealing ring in said clearance occupying less than the full area of said clearance to permit free swivelling of said sleeve member and being relatively free to move toward the opposite ends of the clearance in response to longitudinal pressure differentials in the interface area between the members.

3. In combination in a swivel coupling, a tubular member, an elongated externally threaded sleeve member freely swivelly disposed about said tubular member, said tubular member having axially disposed radially extending integral portions spaced apart less than the length of said sleeve member and having radial extent greater than the normal internal diameter of the sleeve member, one end of the sleeve member opposing one of said radially extending portions, the opposite end section of the sleeve member having an internal enlargement within which the remaining radially extending portion is freely encompassed and being of a depth to afford a substantial longitudinal clearance inwardly from the encompassed portion, and a resilient sealing ring in said clearance occupying less than the full area of said clearance to permit free swivelling of said sleeve member, the inner end of the sleeve end section enlargement being defined by a wall tapering longitudinally inwardly and toward the encompassed tubular member and said radially extending portion within the enlargement having an opposing wall tapering longitudinally outwardly and toward the surrounding sleeve end section, said sealing ring being of normally less cross-sectional area than the confining chamber defined between said tapering walls and the intervening opposing spaced portions of the members and being pressure responsively movable longitudinally of the assembly wedgingly into the respective wedge-shaped corners where said tapering walls converge toward the surfaces of the respective opposing members.

NORMAN M. COUTY.

REFERENCES CITED

The following references are of record in the file of this patent:

UNITED STATES PATENTS

| Number | Name | Date |
|---|---|---|
| 1,590,357 | Feisthamel | June 29, 1926 |
| 2,273,397 | Couty | Feb. 12, 1942 |

FOREIGN PATENTS

| Number | Country | Date |
|---|---|---|
| 293,674 | Great Britain | July 12, 1928 |